(12) United States Patent
Evans et al.

(10) Patent No.: US 11,370,504 B2
(45) Date of Patent: Jun. 28, 2022

(54) MOBILITY SCOOTER WITH FOLDING FEATURE AND RELATED METHODS

(71) Applicants: Barbara Evans, Anderson, SC (US); Robert Evans, Jr., Edgewater, FL (US)

(72) Inventors: Barbara Evans, Anderson, SC (US); Robert Evans, Jr., Edgewater, FL (US)

( * ) Notice: Subject to any disclaimer, the term of this patent is extended or adjusted under 35 U.S.C. 154(b) by 0 days.

(21) Appl. No.: 17/446,487

(22) Filed: Aug. 31, 2021

(65) Prior Publication Data
US 2022/0063753 A1 Mar. 3, 2022

Related U.S. Application Data

(60) Provisional application No. 63/073,984, filed on Sep. 3, 2020.

(51) Int. Cl.
| | | |
|---|---|---|
| *B62K 15/00* | (2006.01) | |
| *A61H 3/04* | (2006.01) | |
| *B62K 3/16* | (2006.01) | |
| *B62K 5/023* | (2013.01) | |
| *A61H 3/00* | (2006.01) | |

(52) U.S. Cl.
CPC ............ *B62K 15/006* (2013.01); *A61H 3/04* (2013.01); *B62K 3/16* (2013.01); *B62K 5/023* (2013.01); *A61H 2003/005* (2013.01)

(58) Field of Classification Search
CPC ........ B62K 15/006; B62K 3/16; B62K 5/023; A61H 3/04; A61H 2003/005
See application file for complete search history.

(56) References Cited

U.S. PATENT DOCUMENTS

| | | | |
|---|---|---|---|
| 3,354,975 A | | 11/1967 | Stuart |
| 4,065,145 A | * | 12/1977 | Chambers ................ A61G 5/00 280/87.021 |
| 10,654,541 B2 | | 5/2020 | Etzelsberger et al. |
| 11,104,398 B1 | * | 8/2021 | Peace ...................... B62K 5/08 |
| 2007/0182116 A1 | * | 8/2007 | Davey ...................... B62K 3/16 280/87.05 |
| 2011/0247889 A1 | | 10/2011 | Kosco et al. |
| 2015/0209205 A1 | | 7/2015 | Ransenberg et al. |
| 2018/0015978 A1 | | 1/2018 | Delgatty et al. |
| 2018/0162479 A1 | | 6/2018 | Mazar et al. |

* cited by examiner

*Primary Examiner* — Bryan A Evans
(74) *Attorney, Agent, or Firm* — Allen, Dyer, Doppelt + Gilchrist, PA (57) ABSTRACT

A mobility scooter includes a first member having a first end, and a second end opposite the first end, and a rear wheel assembly coupled to the second end of the first member. The mobility scooter includes a seat assembly coupled to the first member, and a second member being transverse to the first member and having a first end coupled to the first end of the first member, and a second end opposite the first end of the second member. The mobility scooter further includes a steering column having a first end, and a second end opposite the first end of the steering column. The steering column is coupled to the second end of the second member. The mobility scooter includes a front wheel coupled to the second end of the steering column, and a handlebar coupled to the first end of the steering column.

20 Claims, 10 Drawing Sheets

MOBILITY SCOOTER WITH FOLDING FEATURE AND RELATED METHODS

RELATED APPLICATION

This application claims priority to prior filed provisional application No. 63/073,984 filed Sep. 3, 2020, the entire subject matter of which is incorporated herein by reference in its entirety.

TECHNICAL FIELD

The present disclosure relates to the field of mobility scooters, and, more particularly, to a mobility scooter with folding capabilities and related methods.

BACKGROUND

Mobility devices for people with mobility issues are quite common and varied in the medical device industry. For example, the powered wheelchair is nearly ubiquitous in deployment, even being commonly available at most retail outlets for customers with mobility issues. The powered wheelchair is generally for immobile patients or patients with very limited mobility. For patients with limited mobility, the unpowered walker device is another approach. Another common mobility device type is the scooter.

In one approach for a patient with a single injured knee/leg, a knee scooter may be used. Here, the patient propels the knee scooter with the uninjured leg while the injured leg rests on a pad. Other scooter approaches are disclosed in: U.S. Patent Application Publication No. 2015/0209205 to Ransenberg et al., which discloses a three-wheeled mobility scooter; U.S. Patent Application Publication No. 2018/0015978 to Delgatty et al., which discloses a three-wheeled mobility scooter, which also folds; and U.S. Pat. No. 10,654,541 to Etzelsberger et al., which discloses a scooter that also folds and includes a medial seat.

SUMMARY

Generally, a mobility scooter may include a first member having a first end, and a second end opposite the first end, and a rear wheel assembly coupled to the second end of the first member. The mobility scooter may include a seat assembly coupled to the first member, and a second member being transverse to the first member and having a first end coupled to the first end of the first member, and a second end opposite the first end of the second member. The mobility scooter may further include a steering column having a first end, and a second end opposite the first end of the steering column. The steering column may be coupled to the second end of the second member. The mobility scooter may include a front wheel coupled to the second end of the steering column, and a handlebar coupled to the first end of the steering column.

Additionally, the mobility scooter may include a third member transverse to the first member and being coupled between the second end of the first member and the rear wheel assembly. The rear wheel assembly may comprise a crossmember coupled to the third member and having a first end and a second end opposite to the first end of the crossmember, first and second arms extending respectively from the first end and second ends of the crossmember, and first and second wheels respectively coupled to the first and second arms. The first arm and the second arm each may extend downwardly and away from the crossmember. The first member may comprise a first pivoting joint between the second end of the first member and the seat assembly, and the first pivoting joint may permit the rear wheel assembly to switch between an extended state and a retracted state. The steering column may comprise a second pivoting joint between the first end of the steering column and the second end of the second member, and the second pivoting joint may permit the handlebar to switch between an extended state and a retracted state.

In some embodiments, the second member may comprise an arcuate member. The seat assembly may include a telescoping post coupled to the first member, and a seat coupled to the telescoping post. The seat assembly may be substantially perpendicular to the first member.

Another aspect is directed to a method of making a mobility scooter. The method may include providing a first member having a first end, and a second end opposite the first end, and coupling a rear wheel assembly to the second end of the first member. The method may comprise coupling a seat assembly to the first member, providing a second member being transverse to the first member and having a first end coupled to the first end of the first member, and a second end opposite the first end of the second member. The method may further comprise coupling a steering column having a first end, and a second end opposite the first end of the steering column, the steering column being coupled to the second end of the second member. The method may include coupling a front wheel to the second end of the steering column, and coupling a handlebar to the first end of the steering column.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring to FIGS. 1A-1B, 2, & 3A-4B, a mobility scooter 100 according to the present disclosure is now described. The mobility scooter 100 illustratively includes a first arm 101 having a first end 102, and a second end 103 opposite the first end. The mobility scooter 100 illustratively comprises a rear axle 104 coupled to the second end 103 of the first arm 101, and first and second wheels 105a-105b coupled respectively to first and second opposing ends of the rear axle. The first arm 101 comprises a telescoping feature permitting adjustment of a longitudinal length thereof.

Figure 1A:
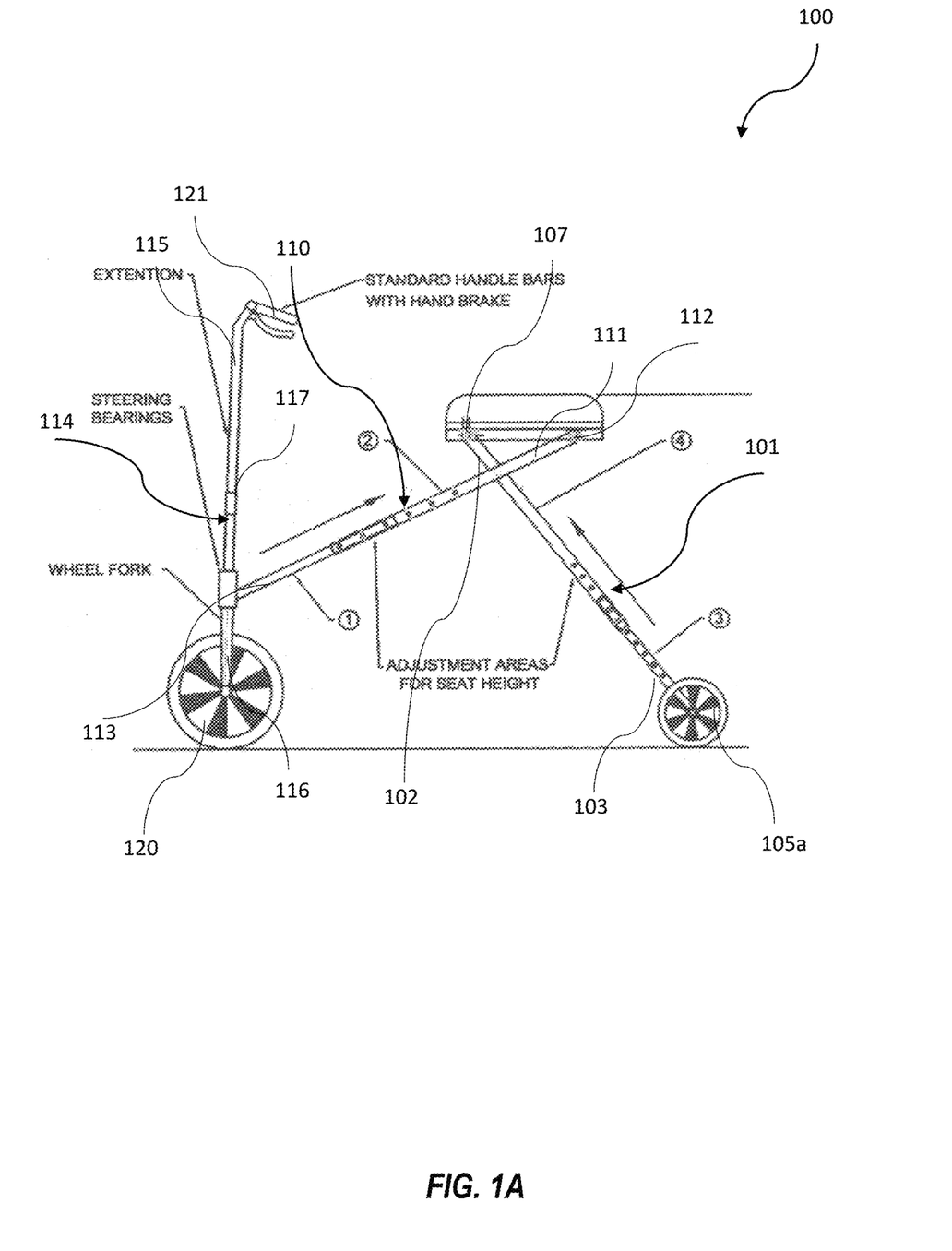
FIG. 1A is a schematic side view of a first embodiment of a mobility scooter in an extended state, according to the present disclosure.
Figure 1B:
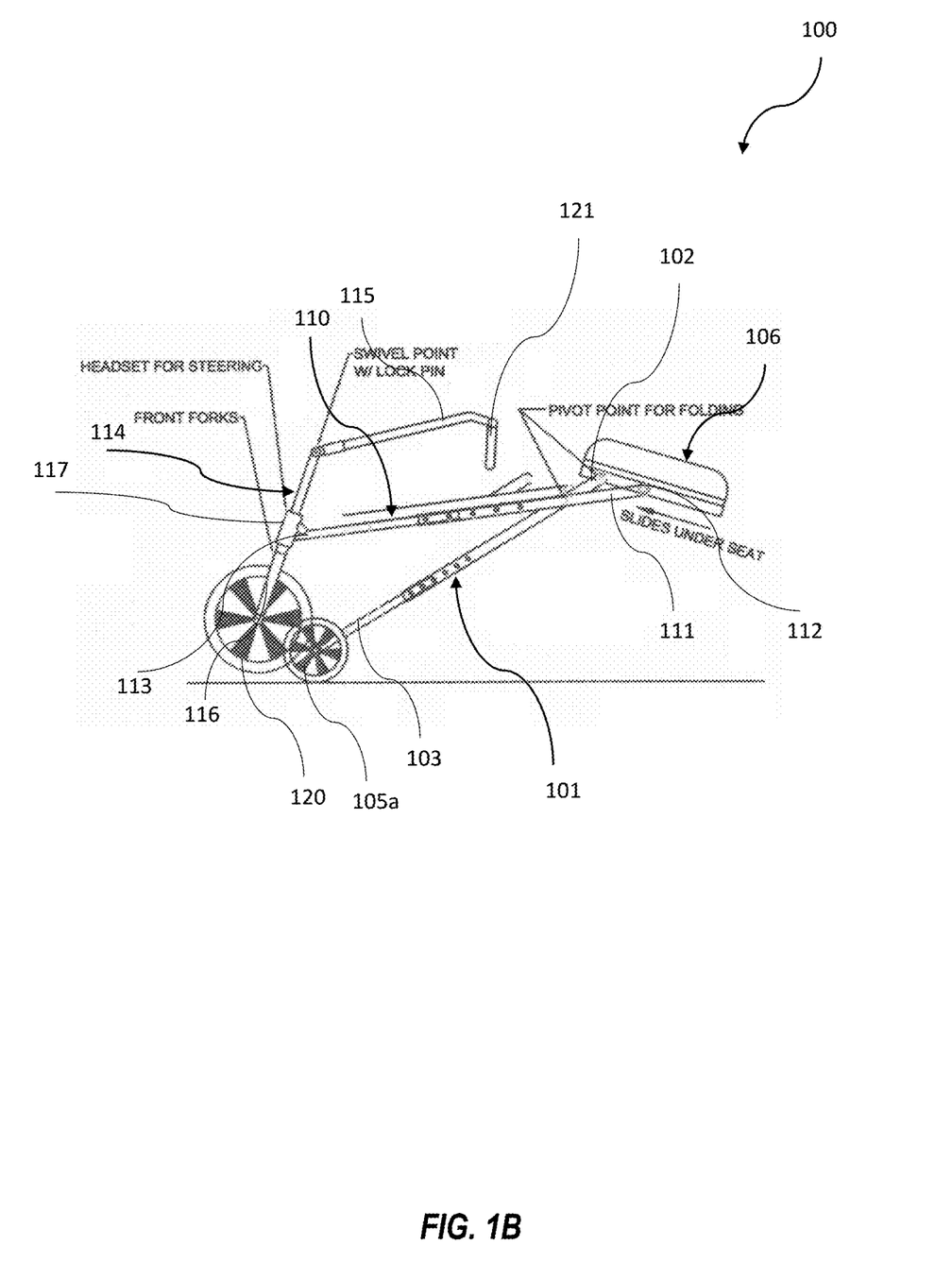
FIG. 1B is a schematic side view of the mobility scooter from FIG. 1A in a retracted state.
Figure 2:
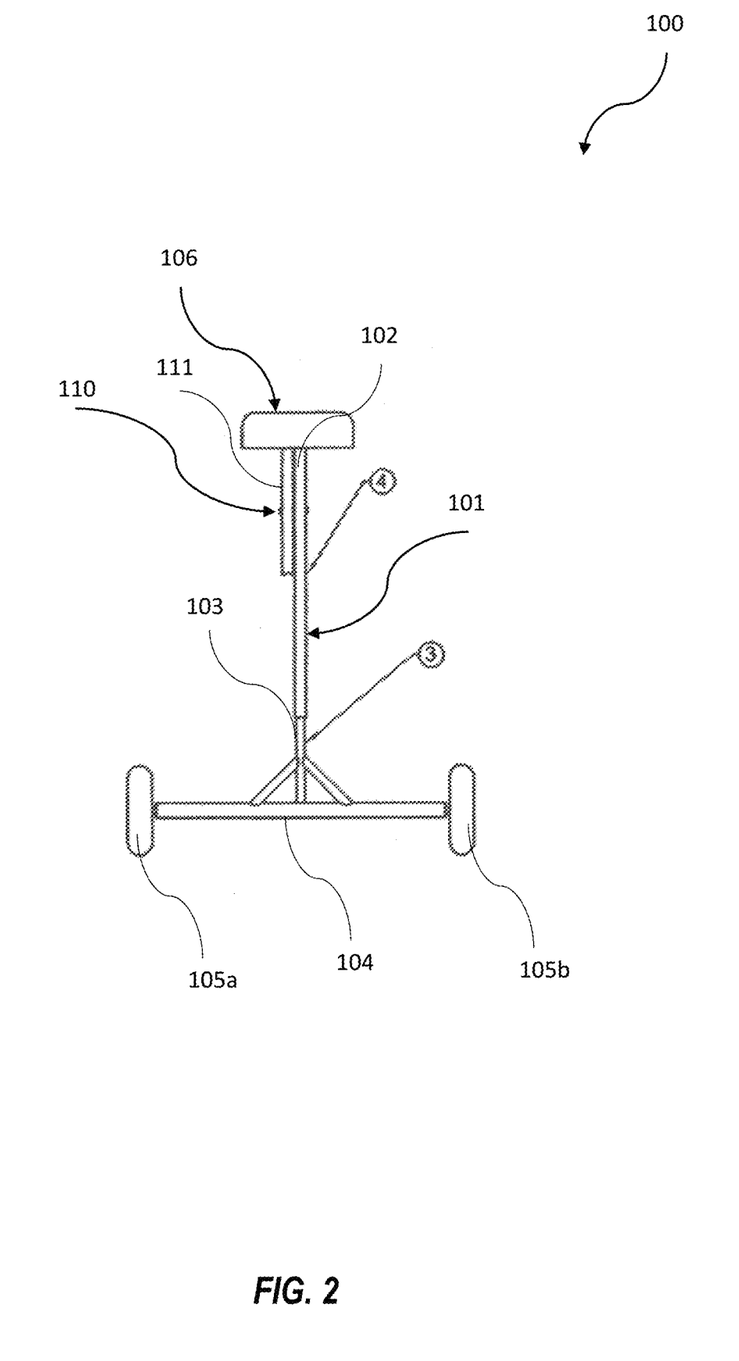
FIG. 2 is a partial schematic rear view of the mobility scooter from FIGS. 1A-1B.
Figure 3A:
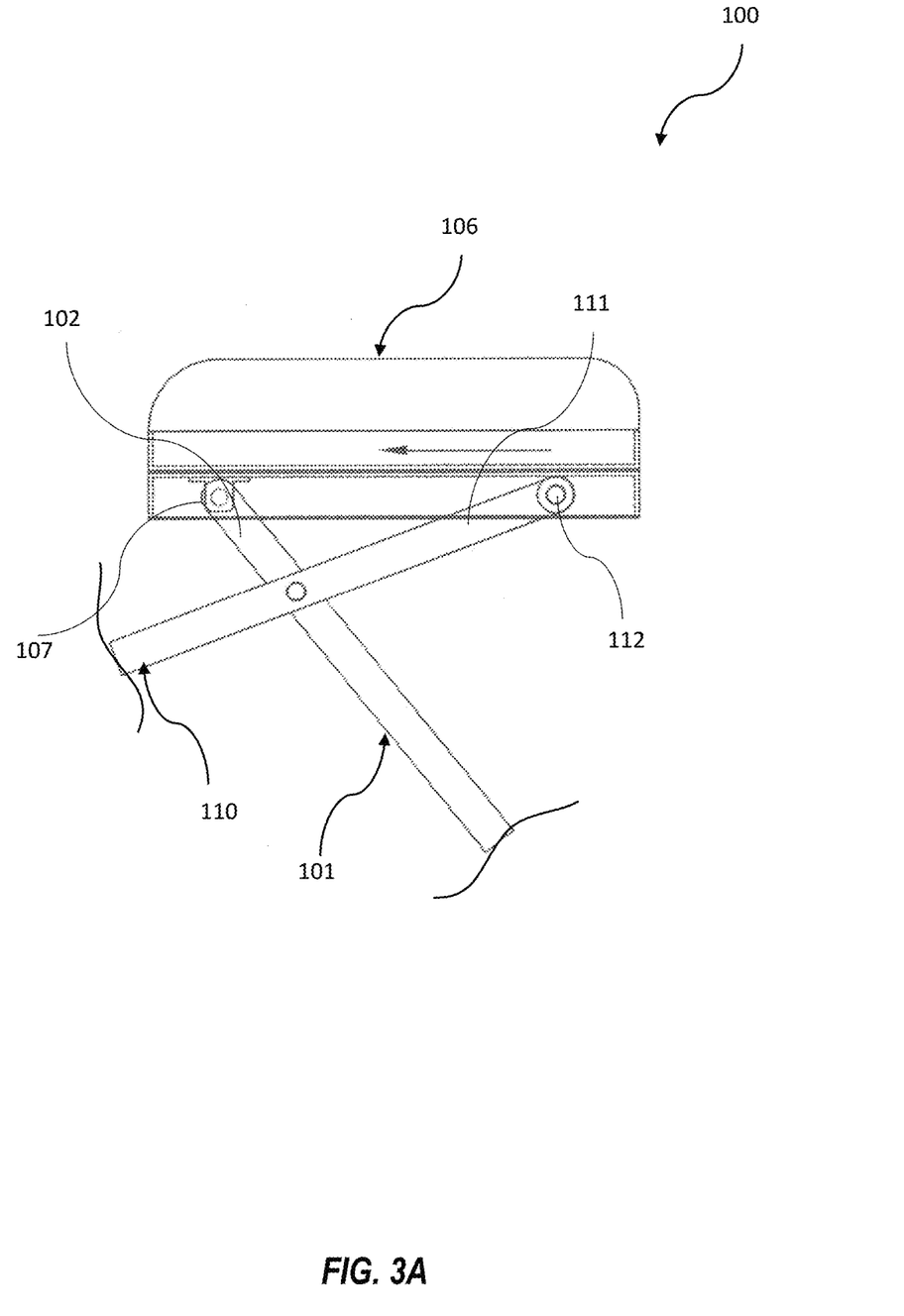
FIG. 3A is a schematic side view of the seat from the mobility scooter from FIGS. 1A-1B in the extended state.
Figure 3B:
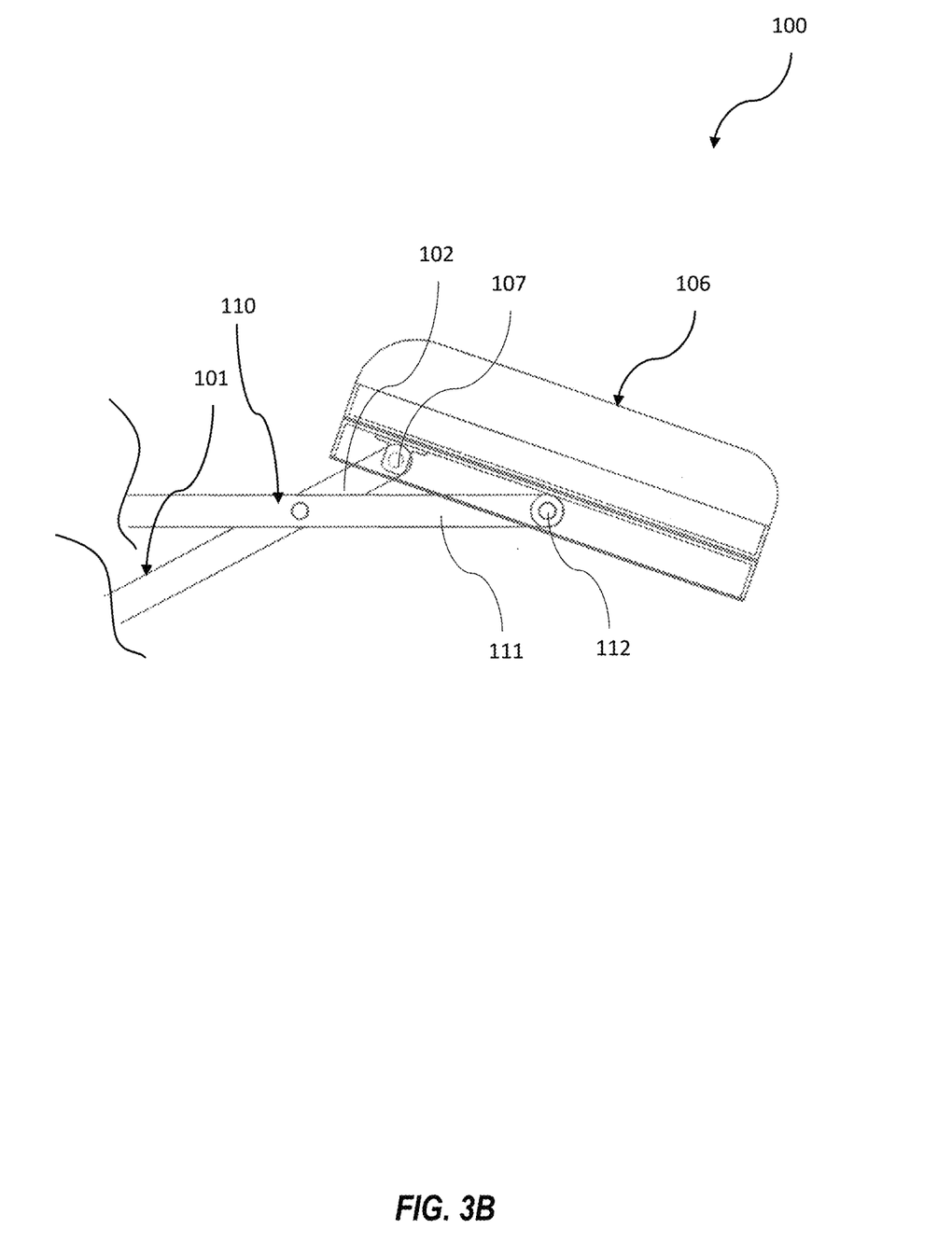
FIG. 3B is a schematic side view of the seat from the mobility scooter from FIGS. 1A-1B in the retracted state.

In the illustrated embodiment, the rear axle 104 is coupled to the first arm 101 via a pair of braces. In some embodiments, the pair of braces and the second end 103 of the first arm 101 may be welded at their connection points, but in other embodiments, the connection points may accomplished using fasteners, such as threaded screws. In some embodiments, the rear axle 104 may also fold inwardly (i.e. towards the first arm 101) about a center point.

The mobility scooter 100 illustratively comprises a seat 106 having a first end, and a second end opposite the first end of the seat. The uppermost portion of the seat 106 illustratively comprises a flexible surface, for example, a cushion. The first end of the seat 106 is coupled to the first end 102 of the first arm 101 at a first pivot point 107. The first pivot point 107 comprises a stationary pivot point permitting the first arm 101 to rotate about the first pivot point when switching between the retracted state and the extended state.

Figure 4A:
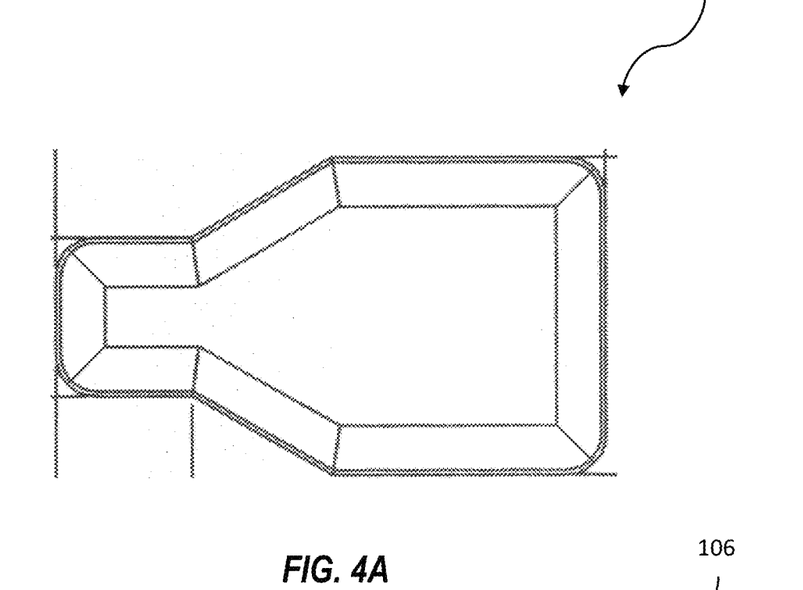
FIG. 4A is a schematic top plan view of the seat from the mobility scooter from FIGS. 1A-1B.
Figure 4B:
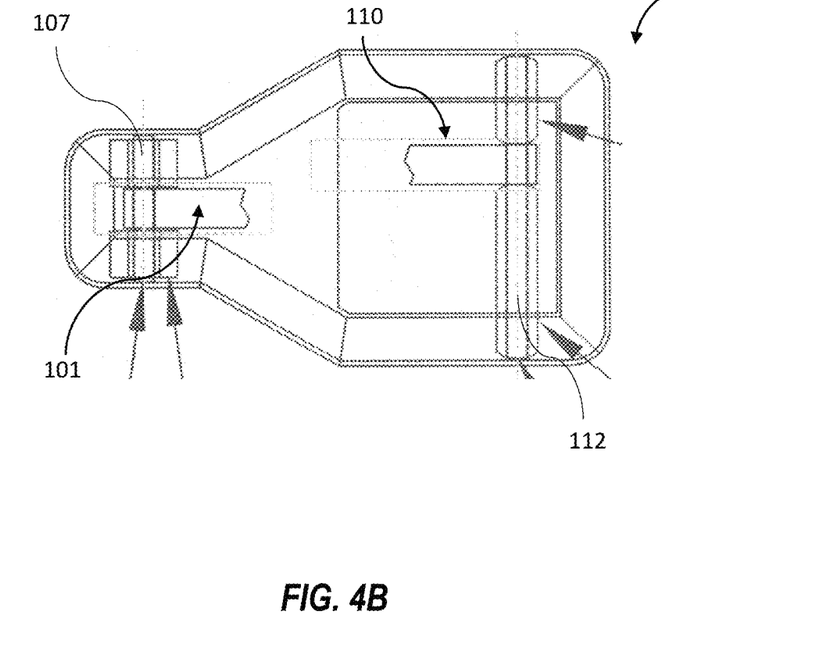
FIG. 4B is a schematic bottom plan view of the seat from the mobility scooter from FIGS. 1A-1B.

As perhaps best seen in FIGS. 4A-4B, the seat 106 includes a multi-section shape. The forward section comprises a rectangle shape; the medial section comprises a trapezoid shape; and the rearward section comprises a rectangle shape of greater width than the forward section.

The mobility scooter 100 illustratively comprises a second arm 110 having a first end 111 coupled to the second end of the seat 106 at a second pivot point 112, and a second end 113 opposite the first end of the second arm. The second arm 110 comprises a telescoping feature permitting adjustment of a longitudinal length thereof. As perhaps best seen in FIGS. 3A-3B, the second pivot point 112 comprises a sliding pivot point (i.e. sliding longitudinally between the first and second end of the seat 106) permitting the second arm to rotate about the sliding pivot point.

The mobility scooter 100 illustratively includes a steering column 114 having a first end 115, a second end 116 opposing the first end of the steering column, and a folding point 117 between the first end and the second end of the steering column. The folding point 117 illustratively includes a locking feature (e.g. a locking pin) to lock the second end 116 of the steering column 114 in an upright state (FIG. 1A) or in a retracted state (FIG. 1B). The second end 116 illustratively comprises a fork with first and second opposing forked arms.

The mobility scooter 100 illustratively includes a third wheel 120 coupled to the first and second opposing forked arms of the second end 116 of the steering column 114, and a handlebar 121 coupled to the first end 115 of the steering column. The first end 115 of the steering column 114 comprises a telescoping feature permitting adjustment of a longitudinal length thereof. In the illustrated embodiment, the telescoping features of the first arm 101, the second arm 110, and the steering column 114 may comprise concentric tubes with a push button release function. Of course, in other embodiments, other forms of longitudinal length adjustment can be used.

The mobility scooter 100 illustratively includes a handbrake carried by the handlebar 121 of the steering column 114. The handbrake is configured to selectively lock the first and second wheels 105a-105b, and the third wheel 120. In some embodiments, the first and second wheels 105a-105b, and the third wheel 120 may each comprise an airless rubber tire. Of course, in other embodiments, the first and second wheels 105a-105b, and the third wheel 120 may each comprise a mechanically resistant polyurethane based wheel and associated ball bearing.

As perhaps best seen in FIG. 4B, the second pivot point 112 comprises a handle bar. The handle bar is configured to permit easy carrying of the mobility scooter 100 when in the retracted state. The first arm 101, the second arm 110, the steering column 114, and the rear axle 104 may all each comprise a metallic tube, for example, an aluminum tube.

Moreover, although the illustrated embodiment of the mobility scooter 100 is unpowered, the mobility scooter may comprise an electric motor carried by the first arm 101 and driving one or both of the first and second wheels 105a-105b. In the illustrated embodiment, the user would drive the mobility scooter 100 via the legs flanking the sides.

Another aspect is directed to a method for making a mobility scooter 100. The method includes positioning a first arm 101 having a first end 102, and a second end 103 opposite the first end, and coupling first and second wheels 105a-105b to the second end of the first arm. The method comprises coupling a seat 106 to the first end 102 of the first arm 101, and coupling a first end 111 of a second arm 110 to the seat. The method further comprises coupling a second end 116 of a steering column 114 to a third wheel 120, and coupling a handlebar 121 to a first end 115 of the steering column.

Advantageously, the mobility scooter 100 may be readily transported in the retracted state. This is because of the lightweight nature of the mobility scooter 100 and the small footprint in the retracted state.

Referring now to FIGS. 5-8, another embodiment of a mobility scooter 300 according to the present disclosure is now described. It should be appreciated that the features of the above embodiments of the mobility scooters 100 may also be incorporated into this embodiment. The mobility scooter 300 incorporates a nearly standing height, unlike existing mobility devices. The user 322 would be employing a nearly normal walking gait, not a scooter type form of propulsion.

The mobility scooter 300 illustratively includes a first member 301 having a first end 302a, and a second end 302b opposite the first end. The first member 301 is substantially straight.

The mobility scooter 300 includes a second member 303 being transverse to the first member 301 and having a first end 304a coupled to the first end 302a of the first member 301. In the illustrated embodiment, the second member 303 comprises a partially arcuate member. The second member 303 includes a second end 304b opposite the first end 304a. The first end 304a is arcuate in shape, and the second end 304b is illustratively straight in shape, but may alternatively be arcuate in shape in other embodiments.

The mobility scooter 300 illustratively includes a rear wheel assembly 305 coupled to the second end 302b of the first member 301. The mobility scooter 300 includes a third member 306 transverse to the first member 301 and being coupled between the second end 302b of the first member and the rear wheel assembly. The third member 306 extends upwardly and away from the first member 301. In the illustrated embodiment, the third member 306 is substantially perpendicular (i.e. ±5° of perpendicular) to the first member 301.

Figure 8:
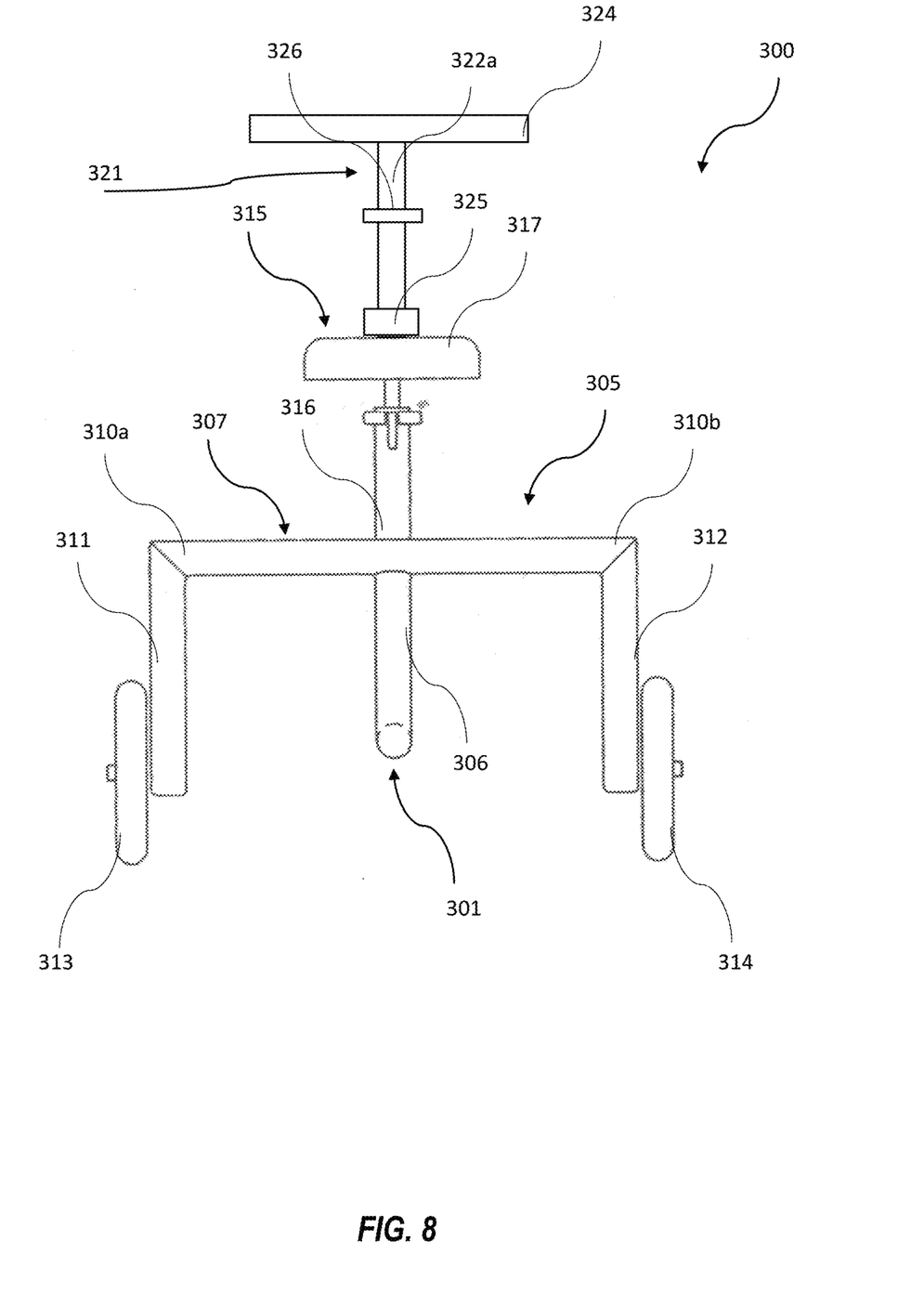
FIG. 8 is a rear view of the mobility scooter of FIG. 5.

The rear wheel assembly 305 illustratively includes a crossmember 307 coupled to the third member 306. In the illustrated embodiment, the crossmember 307 is substantially perpendicular (i.e. ±5° of perpendicular) to the third member 306.

The crossmember 307 illustratively includes a first end 310a and a second end 310b opposite to the first end. The rear wheel assembly 305 also includes first and second arms 311, 312 extending respectively from the first end 310a and the second end 310b of the crossmember 307, and first and second wheels 313, 314 respectively coupled to the first and second arms. The first arm 311 and the second arm 312 each extends downwardly and away from the crossmember 307 and toward the first member 301, and each is substantially parallel (i.e. ±5° of parallel) to the third member 306. In the illustrated embodiment, the first and second arms 311, 312 are substantially perpendicular (i.e. ±5° of perpendicular) to the crossmember 307. In other embodiments, the first and second arms 311, 312 are canted at oblique angles to the crossmember 307.

Figure 5:
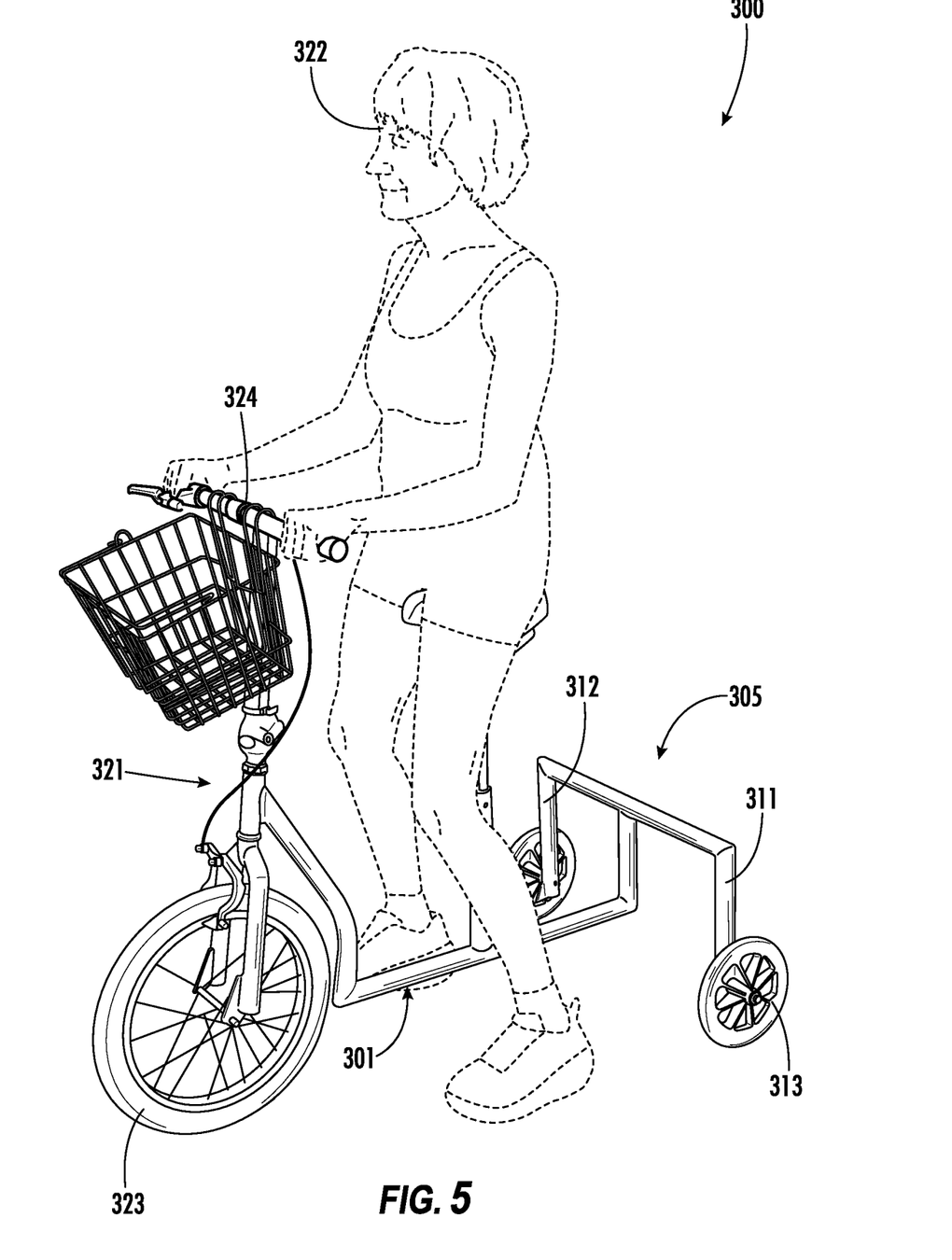
FIG. 5 is a schematic perspective view of a second embodiment of the mobility scooter with a user and accessories, according to the present disclosure.
Figure 6:
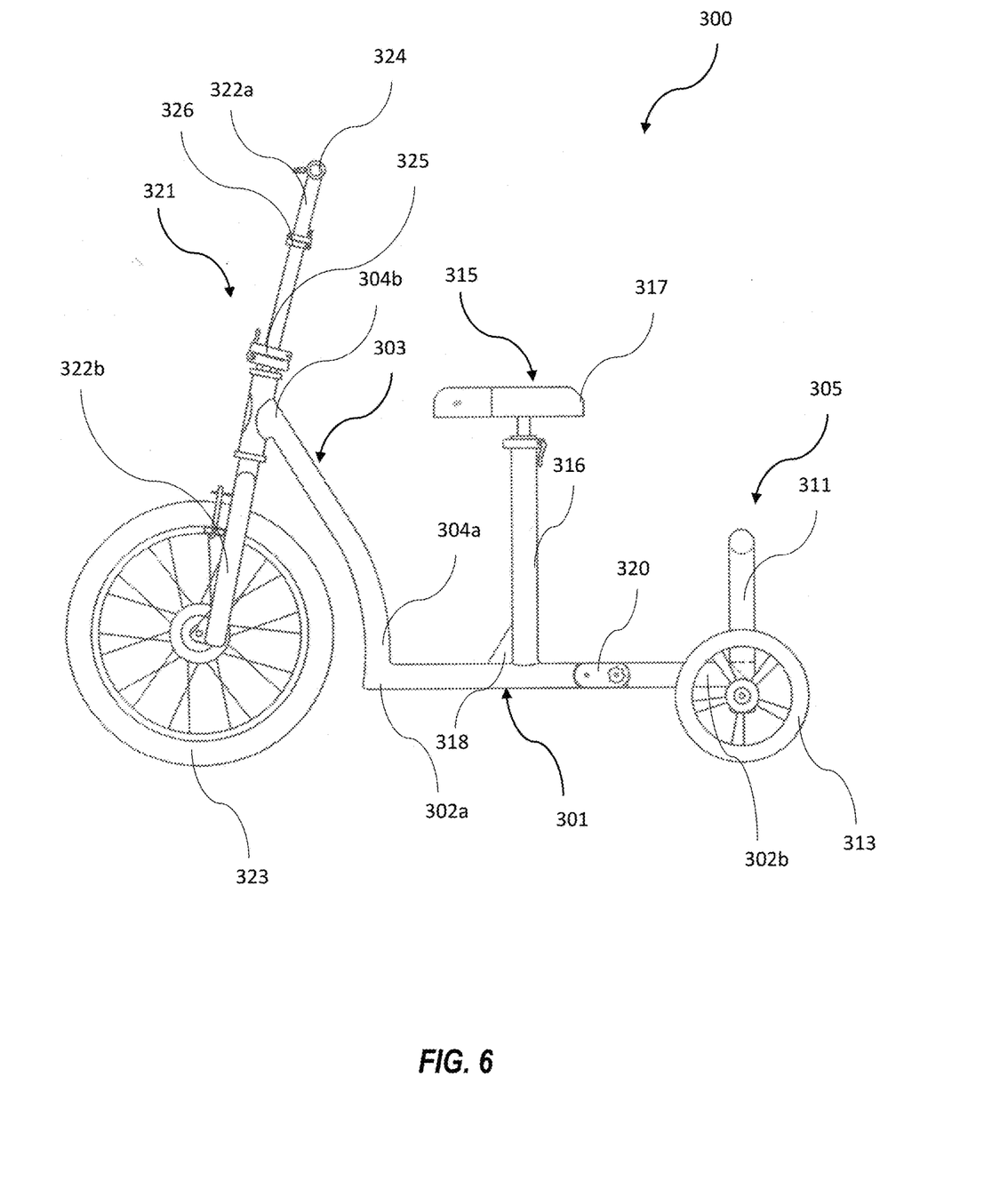
FIG. 6 is a schematic side view of the mobility scooter of FIG. 5 in an extended state, according to the present disclosure.
Figure 7:
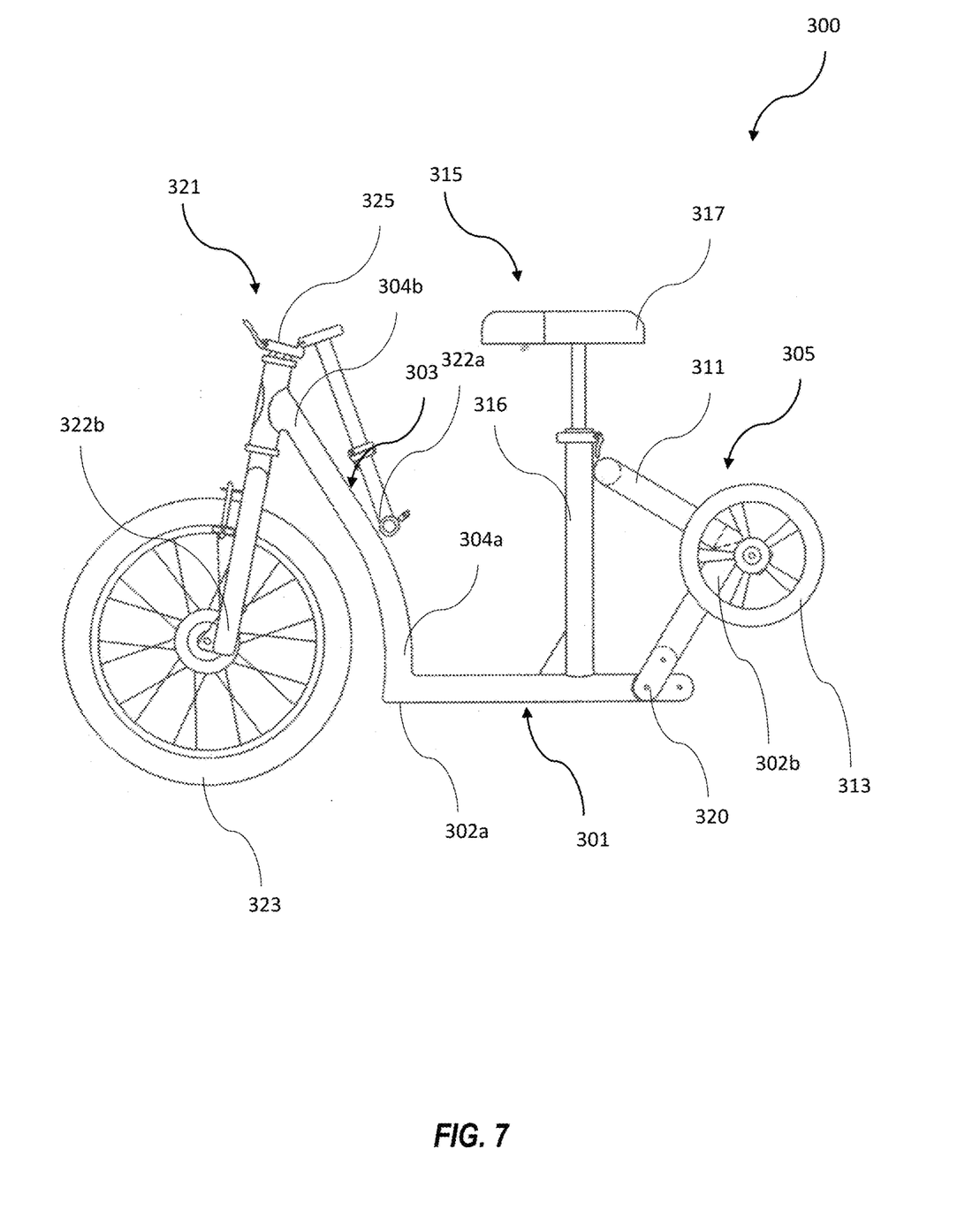
FIG. 7 is a schematic side view of the mobility scooter of FIG. 5 in a retracted state.

The mobility scooter 300 includes a seat assembly 315 coupled to the first member 301. The seat assembly 315 illustratively comprises a telescoping post 316 coupled to the first member 301, and a seat 317 coupled to the telescoping post opposite the first member. The seat assembly 315 is substantially perpendicular (i.e. ±5° of perpendicular) to the first member 301. The seat assembly also illustratively includes a strut member 318 coupled between the telescoping post 316 and the first member 301 to provide structural rigidity to the seat assembly 315.

The telescoping post 316 comprises a telescoping feature. The telescoping feature may be enabled by a pair of concentric tubes, and a friction based clamp on the outer tube, such as in the illustrated example. In other embodiments, the telescoping feature may comprise a pair of concentric tubes with overlapping sets of openings, and a spring loaded push button.

The first member 301 illustratively comprises a first pivoting joint 320 between the second end 302b of the first member and the seat assembly 315. The first pivoting joint 320 may permit the rear wheel assembly 305 to switch between an extended state (FIG. 6) and a retracted state (FIG. 7). The first pivoting joint 320 may comprise a pivoting joint.

The mobility scooter 300 includes a steering column 321 having a first end 322a, and a second end 322b opposite the first end. The steering column 321, between the first end 322a, and the second end 322b, is coupled to the second end 304b of the second member 303. The mobility scooter 300 includes a front wheel 323 coupled to the second end 322b of the steering column 321, and a handlebar 324 coupled to the first end 322a of the steering column. The second end 322b of the steering column 321 illustratively comprises a set of opposing forked arms for receiving a hub of the front wheel 323. The steering column 321 illustratively comprises a second pivoting joint 325 between the first end 322a of the steering column and the coupling to the second end 304b of the second member 303. The second pivoting joint 325 may permit the handlebar 324 to switch between an extended state (FIG. 6) and a retracted state (FIG. 7). The first end 322a of the steering column 321 also comprises a telescoping feature 326.

In some embodiments, each of the first and second pivoting joints 320, 325 comprises opposing overlapping sets of first and second arms, one or more fasteners rotationally coupling the opposing overlapping sets of first and second arms together, and a locking fastener for locking the pivoting joint in one of the states, such as the illustrated example of the first pivoting joint 320. In other embodiments, the pivoting joint comprises overlapping openings defined by respective ends, and a fastener (e.g. threaded bolt and nut) extending through the overlapping openings. In some embodiments, each of the first and second pivoting joints 320, 325 comprises a hinged joint, such as the illustrated example of the second pivoting joint 325.

In some embodiments, one or more of the first member 301, the second member 303, the third member 306, the crossmember 307, the first and second arms 311, 312, the steering column 321, and the handlebar 324 are tubular (e.g. cross-sectional shape of round shape or rectangle shape) in shape and hollow. Also, the first member 301, the second member 303, the third member 306, the crossmember 307, the first and second arms 311, 312, the steering column 321, and the handlebar 324 each comprises a rigid material with sufficient mechanical strength to withstand typical stresses from a rider, for example, aluminum or steel.

Moreover, although not depicted in FIGS. 6-8, the mobility scooter 300 may include an electric motor and battery for propulsion, which are optional. Also, as shown in FIG. 5 for illustrative purposes, the mobility scooter 300 may include brakes and other typical scooter accessories, such as a basket, a light, for example.

Another aspect is directed to a method of making a mobility scooter 300. The method includes providing a first member 301 having a first end 302a, and a second end 302b opposite the first end, and coupling a rear wheel assembly 305 to the second end of the first member. The method comprises coupling a seat assembly 315 to the first member 301, providing a second member 303 being transverse to the first member and having a first end 304a coupled to the first end 302a of the first member 301, and a second end 304b opposite the first end of the second member. The method further comprises coupling a steering column 321 having a first end 322a, and a second end 322b opposite the first end of the steering column, the steering column being coupled to the second end 304b of the second member 303. The method includes coupling a front wheel 323 to the second end 322b of the steering column 321, and coupling a handlebar 324 to the first end 322a of the steering column.

Advantageously, the mobility scooter 300 is designed for people with one or more of: limited use of their legs due to weakness, impaired joints or circulation, balance issues, or spinal anomalies that result in pain or tiredness after prolonged periods of walking or standing. Here, the person propels the scooter with both legs and feet while slightly seated (approximately 2 inches below inseam measurement) and incorporating a more or less normal stride.

Helpfully, the mobility scooter 300 may provide mobility to users with limited mobility and stamina. The mobility scooter 300 may be less expensive than typical motorized scooters, and easier to transport. In fact, with the first and second pivoting joints 320, 325, the mobility scooter 300 is readily placed in the retracted state for transportation. Moreover, the mobility scooter 300 simple design and manual propulsion may provide less social stigma to the user. Also, as shown in FIG. 5, the user 322 may maintain a near standing gait while using the mobility scooter 300. This enables the user 322 to receive mobility assistance while exerting some effort, which can be helpful in rehabilitation applications. In short, the mobility scooter 300 may provide an intermediate device between a wheelchair and a walking stick/cane, for example.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A mobility scooter comprising:
   a first member having a first end, and a second end opposite the first end;
   a rear wheel assembly coupled to the second end of the first member;
   a seat assembly coupled to the first member;
   a second member being transverse to the first member and having a first end coupled to the first end of the first member, and a second end opposite the first end of the second member;
   a steering column having a first end, and a second end opposite the first end of the steering column, the steering column being coupled to the second end of the second member;
   a front wheel coupled to the second end of the steering column; and
   a handlebar coupled to the first end of the steering column;
   the first member comprising a first pivoting joint between the second end of the first member and the seat assembly, the first pivoting joint to permit the rear wheel assembly to switch between an extended state and a retracted state.

2. The mobility scooter of claim 1 further comprising a third member transverse to the first member and being coupled between the second end of the first member and the rear wheel assembly.

3. The mobility scooter of claim 2 wherein the rear wheel assembly comprises a crossmember coupled to the third member and having a first end and a second end opposite to the first end of the crossmember, first and second arms extending respectively from the first end and second ends of the crossmember, and first and second wheels respectively coupled to the first and second arms.

4. The mobility scooter of claim 3 wherein the first arm and the second arm each extends downwardly and away from the crossmember.

5. The mobility scooter of claim 1 wherein the steering column comprises a second pivoting joint between the first end of the steering column and the second end of the second member, the second pivoting joint to permit the handlebar to switch between an extended state and a retracted state.

6. The mobility scooter of claim 1 wherein the second member comprises an arcuate member.

7. The mobility scooter of claim 1 wherein the seat assembly comprises a telescoping post coupled to the first member, and a seat coupled to the telescoping post.

8. The mobility scooter of claim 1 wherein the seat assembly is substantially perpendicular to the first member.

9. A mobility scooter comprising:
   a first member having a first end, and a second end opposite the first end;
   a rear wheel assembly coupled to the second end of the first member;
   a seat assembly coupled to the first member;
   a second member being transverse to the first member and having a first end coupled to the first end of the first member, and a second end opposite the first end of the second member;
   a third member transverse to the first member and being coupled between the second end of the first member and the rear wheel assembly;
   a steering column having a first end, and a second end opposite the first end of the steering column, the steering column being coupled to the second end of the second member;
   a front wheel coupled to the second end of the steering column; and
   a handlebar coupled to the first end of the steering column;
   the first member comprising a first pivoting joint between the second end of the first member and the seat assembly, the first pivoting joint to permit the rear wheel assembly to switch between an extended state and a retracted state;
   at least one of the first member, the second member, the third member, the steering column, and the handlebar being tubular in shape.

10. The mobility scooter of claim 9 wherein the rear wheel assembly comprises a crossmember coupled to the third member and having a first end and a second end opposite to the first end of the crossmember, first and second arms extending respectively from the first end and second ends of the crossmember, and first and second wheels respectively coupled to the first and second arms.

11. The mobility scooter of claim 10 wherein the first arm and the second arm each extends downwardly and away from the crossmember.

12. The mobility scooter of claim 9 wherein the steering column comprises a second pivoting joint between the first end of the steering column and the second end of the second member, the second pivoting joint to permit the handlebar to switch between an extended state and a retracted state.

13. The mobility scooter of claim 9 wherein the second member comprises an arcuate member.

14. The mobility scooter of claim 9 wherein the seat assembly comprises a telescoping post coupled to the first member, and a seat coupled to the telescoping post.

15. The mobility scooter of claim 9 wherein the seat assembly is substantially perpendicular to the first member.

16. A method of making a mobility scooter, the method comprising:
   providing a first member having a first end, and a second end opposite the first end;
   coupling a rear wheel assembly to the second end of the first member;
   coupling a seat assembly to the first member;
   providing a second member being transverse to the first member and having a first end coupled to the first end of the first member, and a second end opposite the first end of the second member;
   coupling a steering column having a first end, and a second end opposite the first end of the steering column, the steering column being coupled to the second end of the second member;
   coupling a front wheel to the second end of the steering column; and
   coupling a handlebar to the first end of the steering column;
   the first member comprising a first pivoting joint between the second end of the first member and the seat assembly, the first pivoting joint to permit the rear wheel assembly to switch between an extended state and a retracted state.

17. The method of claim 16 further comprising coupling a third member transverse to the first member and being between the second end of the first member and the rear wheel assembly.

18. The method of claim 17 wherein the rear wheel assembly comprises a crossmember coupled to the third member and having a first end and a second end opposite to the first end of the crossmember, first and second arms extending respectively from the first end and second ends of the crossmember, and first and second wheels respectively coupled to the first and second arms.

19. The method of claim 18 wherein the first arm and the second arm each extends downwardly and away from the crossmember.

20. The method of claim 18 wherein the steering column comprises a second pivoting joint between the first end of the steering column and the second end of the second member, the second pivoting joint to permit the handlebar to switch between an extended state and a retracted state.

* * * * *